United States Patent

[11] 3,582,013

[72] Inventor Alessandro Beretta
16, Piazza Insubria, Milan, Italy

[21] Appl. No. 822,374
[22] Filed May 7, 1969
[45] Patented June 1, 1971
[32] Priority May 9, 1968, Aug. 9, 1968
[33] Italy
[31] 16304-A/68 and 20024-A/68

[54] TAPE RECORDER/REPRODUCER DEACTIVATING DEVICE
3 Claims, 10 Drawing Figs.

[52] U.S. Cl. 242/186, 242/191
[51] Int. Cl. B65h 59/38, G03b 1/04, G11b 15/32
[50] Field of Search 242/186, 188—191, 57

[56] References Cited
UNITED STATES PATENTS

| | | | |
|---|---|---|---|
| 3,102,698 | 9/1963 | Atsumi | 242/189 |
| 3,185,401 | 5/1965 | Hardy | 242/188 |

*Primary Examiner*—Leonard D. Christian
*Attorney*—Michael S. Striker

ABSTRACT: A device for automatically deactivating a magnetic tape recorder/reproducer in which the tape is wholly contained in a magazine or cassette, together with a supply and a takeup reel therefor, the ends of the tape being secured to the cores of said reels, and in which the tape is subject to an overpull when completely wound about one reel. The device comprises a tape pull sensing finger subject to displacement when said overpull occurs, a reproducer deactivating device, and trigger means actuated by said sensing finger when displaced for causing said deactivating device to operate, preferably by unlocking a reproducer latch means upon taking-off a force from a rotating flywheel in the apparatus.

INVENTOR.
ALLESSANDRO BERETTA

BY

Attorney

INVENTOR.

ALESSANDRO BERETTA

BY

Michael S. Striker

Attorney

INVENTOR
ALESSANDRO BERETTA

BY
[signature]
ATTORNEY

TAPE RECORDER/REPRODUCER DEACTIVATING DEVICE

BACKGROUND OF THE INVENTION

The invention relates to a magnetic tape recorder/reproducer in which the tape is wholly contained in a replaceable magazine or cassette having a supply reel and a takeup reel housed thereinto. More particularly, this invention is concerned with a device associated to the tape recorder/reproducer for automatically deactivating the same when the magnetic tape is fully wound about the said takeup reel.

Such tape reproducer and recorder apparatuses are well known in the art. For the service, the recorder is provided with a magazine or cassette, consisting of a relatively small flat box, wherein the said two supply and takeup reels are coplanarly and rotatably supported between its major walls. Openings are provided in said major walls for engaging selectively motor driven winding spindles into the winding cores of the reels. The magazine or cassette comprises also tape guide rollers adapted to guide the magnetic tape along a path having a leg or portion parallel to the front face of the cassette, wherein openings are also provided for allowing magnetic erasing means and a scanning or recording/reproducing head member to contact the tape at proper locations along said portion of its path. Another opening is provided to receive an idle pressure roller which urges the tape in frictional relationship with a tape driving spindle or capstan.

The magnetic tape is secured at one end to the core of the supply reel and the other end of the tape is secured to the core of the takeup reel. The said winding spindles are motor driven by means of a transmission including frictionally engaged rotary driving and driven components so that a relatively small pulling force is in any case applied to the tape, whereby when the said tape has completely been wound about one of said reels, and therefore prevented to further progress along said path, no risk of being broken apart occurs.

It has however been found that upon complete winding of the tape about one reel, and more particularly about the takeup reel, a substantial extra pull is applied the tape, and more particularly by the combined action of the driving spindle and of the pulling takeup reel. The motor and the driving component are subject to overwork leading to undesirable heating, wearing and damage. Continuous localized pressure applied to one location of the pressure roller, of rubbery material, might lead to deformation of its outer cylindrical surface.

In addition, while the operator will immediately notice the stopping of the recorder/reproducer when servicing for reproduction, as a result of complete winding of the tape about the takeup reel, no positive and readily detectable warning exists of such stopping when the apparatus is servicing for recording. The operator's attention is often focused on the matter which is being recorded, on the person who is being interviewed and so on. Therefore, in some instance the operator might have actually not recorded some subject matters of great interest while believing to have done so, because when he had noticed the stopping of the recorder he cannot be made aware of how much time has passed after actual stopping.

Even when reproducing the apparatus might remain "on" after stopping for complete winding of the tape. When the user is busy, as for a phone call for example, he might completely forget that the reproducer is on. An overnight overwork might completely damage a reproducer, discharge its storage batteries (if any,) and so on.

It is therefore an object of this invention to provide a recorder/reproducer of the type considered above with a mechanism adapted for overcoming the above and other limitations of prior art devices, in particular with a mechanism adapted for automatically deactivating the recorder, when the tape has been completely wound about one of the reels enclosed in the cassette.

BRIEF SUMMARY OF THE INVENTION

Substantially, the device comprises a tape tension sensing and trigger means, designed for continuously sensing the pull applied to the magnetic tape when the magazine or cassette is positioned, relatively to said erasing, scanning and pressure roller means for cooperation thereof, and for signalling the increase of pull or tension consequent to complete winding of the tape about one reel within the cassette, and a recorder activating means triggered by said former means when said increase of pull is sensed and signalled. The said deactivating means are at their turn designed for allowing reactivation of the recorded only upon performance of the conventional operation of placing the recorder in its "off" position, that is upon having said erasing, scanning and pressure roller means spaced from the tape.

According to a feature of the invention, the said tape tension sensing means consists of a tape follower finger resiliently biased against the tape at a location along said path portion and laterally displacing the tape with a force which might be easily overcome by the increase of pull applied to and tending to straighten the tape, the signal consisting of the motion imparted to said finger by said increase of pull.

According to a preferred embodiment of the invention, the device is associated with a recorder/reproducer wherein the support structures or plates for the magazine or cassette and the said erasing, scanning and pressure roller means, respectively, are relatively movable and resiliently biased towards the spaced or disengaged position of said components, and wherein an operator controlled latch means is provided to lock said plates in reproducer active position wherein said components frictionally engage the tape. The said deactivating means are designed for unlocking said latch means when triggered by said tape pull or pressure sensing means.

According to a most preferred embodiment of the invention, the device as above is associated with a recorder/reproducer the rotary components thereof comprise a relatively fast rotating member having a substantial inertial mass, namely a driven pulley forming a flywheel coaxial and fixedly secured to the said tape driving spindle or capstan, the said deactivating means comprising a shiftable member actuated by the said tape pull sensing means, when signalling said increase of pull, and caused to interfere with the motion of said flywheel and then further shifted under a force resulting by said inertial mass, said force being mechanically applied for unlocking said latch means and hence used for automatically performing the operation leading to a complete deactivation of the recorder as if the operator had voluntarily done so by acting of the recorder deactivation control knob with which such apparatuses are conventionally provided.

These and other features of the invention will be made apparent from a consideration of the accompanying drawings, forming an essential component of this disclosure.

THE VIEWS OF THE DRAWINGS

FIG. 1 is a rather diagrammatical plan view of the preferred embodiment of the unlocking and deactivating mechanism in its inoperative position, that is when a regular reproducing or recording service is on;

FIG. 1A is a view which fragmentarily illustrates the mechanism of FIG. 1, when triggered by the sensing means and actuated by the inertial force supplied by a rotating flywheel;

According to its most preferred embodiment, the device of the invention, as shown in FIGS. 1 to 3A, is associated with a reproducer/recorder (the components thereof which will not describe below, are quite conventional) havihg a flywheel 10 driven by a motor 11 and acting as the driven pulley for a transmission belt 12 tensioned by an idle pulley such as 13. The flywheel 10 is rotated together with a spindle 14 which acts as a frictionally driving capstan for progressing the magnetic tape at its required uniform speed for recording and reproducing.

Figures 2, 2A, 3, 3A:
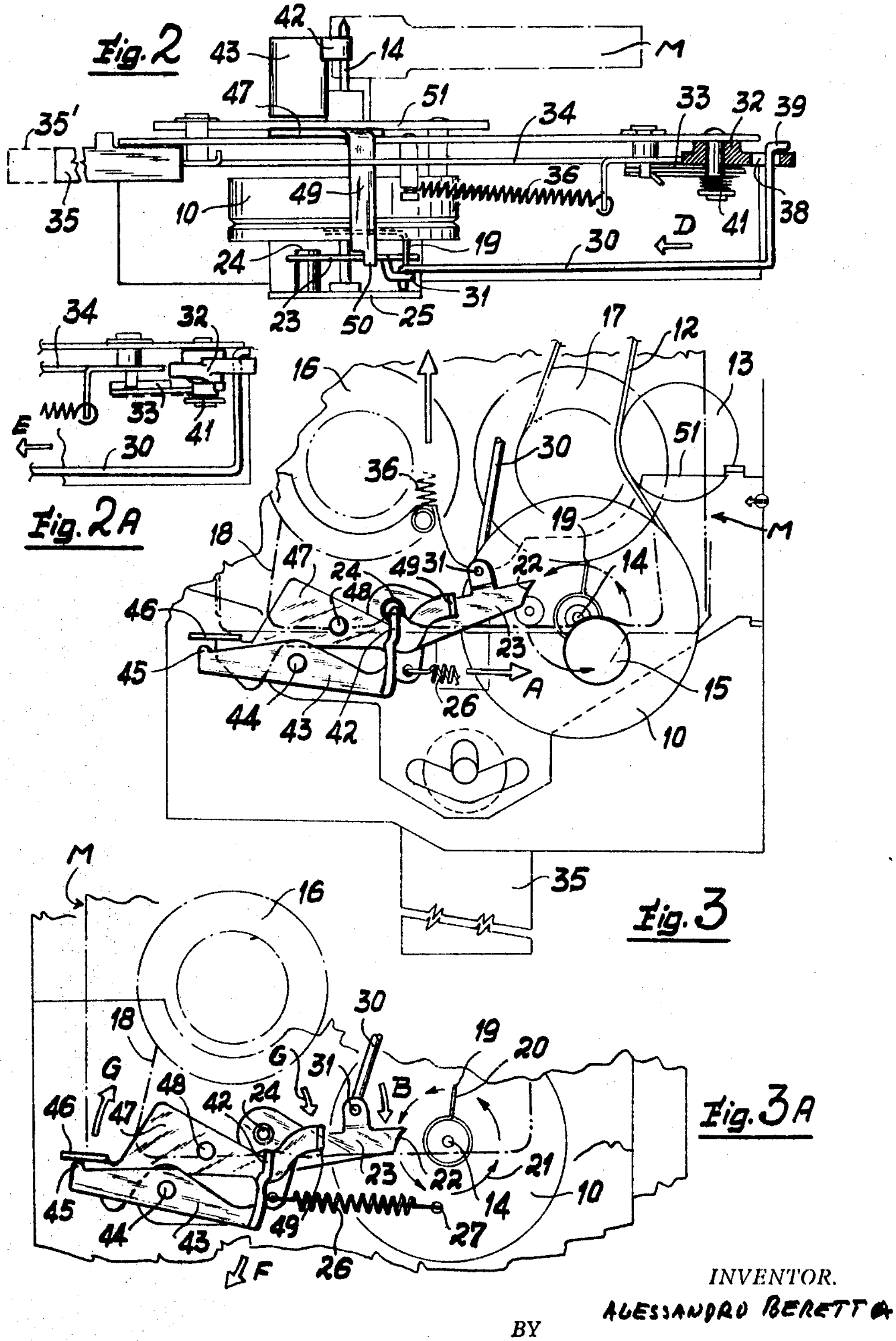
FIG. 2 is a side elevational view and partly a sectional view of the mechanism, shown essentially in the direction indicated by arrow—II— in FIG. 1.
FIG. 2A is a view which illustrates a detail of the latch means.
FIG. 3 is a top plan view illustrating the tape pull sensing means and the mechanism triggered thereby, in their inactive position.
FIG. 3A is a view similar to FIG. 3, but shown the said means and mechanism upon sensing an increased pull in the magnetic tape.

The tape is indicated by a dot-and-dash line at 18 in FIG. 3 and is fully enclosed within a magazine or cassette generally indicated at M and of standard construction. The ends of the tape are secured to the cores of supply reel 16 and of takeup reel 17, within the cassette. The friction of the tape against the spindle 14 is assured by a pressure roller 15 which is partially inserted through a port provided in the front face of the cassette M, when the recorder is in its operational position.

Similarily, in said position, the erasing and the scanning means are partially inserted in the cassette for frictionally engaging the tape between said reels and guidedly progressing adjacently to said front face, as conventional in the art.

A small pin 19, parallel to but radially spaced from the axis of said flywheel 10, is secured to said flywheel by means of a resilient brace 20, for concurrent rotational movement therewith. Said pin therefore describes a circular path such as indicated by the arc-shaped arrows 21 in FIGS. 1, 3 and 3A.

A pointed end portion 22 of a small lever 23, pivoted at 24 to the recorder frame structure (generally indicated at 25), is maintained by a small spring 26, which has one of its ends secured at 27 to same frame structure, very near to but outside of the circular path 21 of the pin 19. The said spring 26 applies a small force in a direction A (FIG. 1) to the lever 23, biasing the same in the position of FIG. 1. The same lever 23 is pivotally connected at 31 to one end of a connecting rod or pitman 30, the other end of which is at its turn connected (such connection will be described in greater detail below) to a conventional cam 32 acting on a conventional latch means 33 which disengageably locks a conventional activation lever 34, connected to a knob 35, and biased by a return spring 36.

Such conventionally constructed components are of the known type requiring a manual action in direction H (FIG. 1) for activating the recorder. Such action causes displacement of lever 34 in same direction until engagement with the latch means 33, which maintains said parts in the position shown in FIG. 1, wherein the recorder eraser and scanning means are partially inserted within the cassette and engage the magnetic tape, while the pressure roller 15 (FIG. 3) urges the tape against the driving spindle 14, for regular recording or reproducing service. Upon a further manual pressure exerted on the knob 35, or other proper action leading to rotation in direction E (FIGS. 1 and 1A) of the cam 32, the latch 33 is caused to disengage the lever 34 and the spring 36 displaces back same lever causing the tape to be disengaged and spaced from the eraser and scanning means and the pressure roller, the same backward or return displacement causing further the opening of the various electrical circuits of the recorder, as well known in the art. The operator controlled knob is indicated in phantom lines at 35' in the position corresponding to full and regular deactivation of the recorder, as provided by voluntary action exerted by the operator.

Assuming now that a small force will be applied in direction B (FIGS. 1A and 3A) to the lever 23, the said force being just as required for overcoming the light bias applied by spring 26, the pointed end 22 will be caused to interfere with the path 21 of the pin 19, which rotates in direction C together with the flywheel 10. Therefore, such pin 19, as soon as it contacts the flank of lever 23 (the resiliency of brace 20 providing shock attenuation), the pin urge further the lever 23 in the same direction B, causing a more extended swinging thereof.

It is evident that the action of pin 19 will be exerted with a relevant force, owing to the inertial mass of the rotating flywheel 10, which drives same pin in its circular path 21. Said action promotes a further rotation in direction E of the latch disengaging cam 32 until full unlocking of lever 34 and return of the recorder components in above discussed full and regular deactivation of the recorder, upon the action of return spring 36.

In other words, the force applied by making use of the inertial mass of flywheel 10 will act as a substitute of force manually exerted by the operator when willing to deactivate the recorder/reproducer apparatus. The application of the force resulting by said inertial mass of rotating flywheel 10 is triggered by the first and small swinging of lever 23 just until interference with the pin 19.

For ensuring that the said trigger action will encounter a resistance as small as possible, the other end 39 of the pitman 30 is engaged within an elongated hole 38 of a lever 37 secured to or integrally formed with the latch disengaging cam 32. A spring 40 is secured to said lever 37 for providing return of the cam and latch means in their regular latching position of FIG. 1.

Figures 1, 1A:
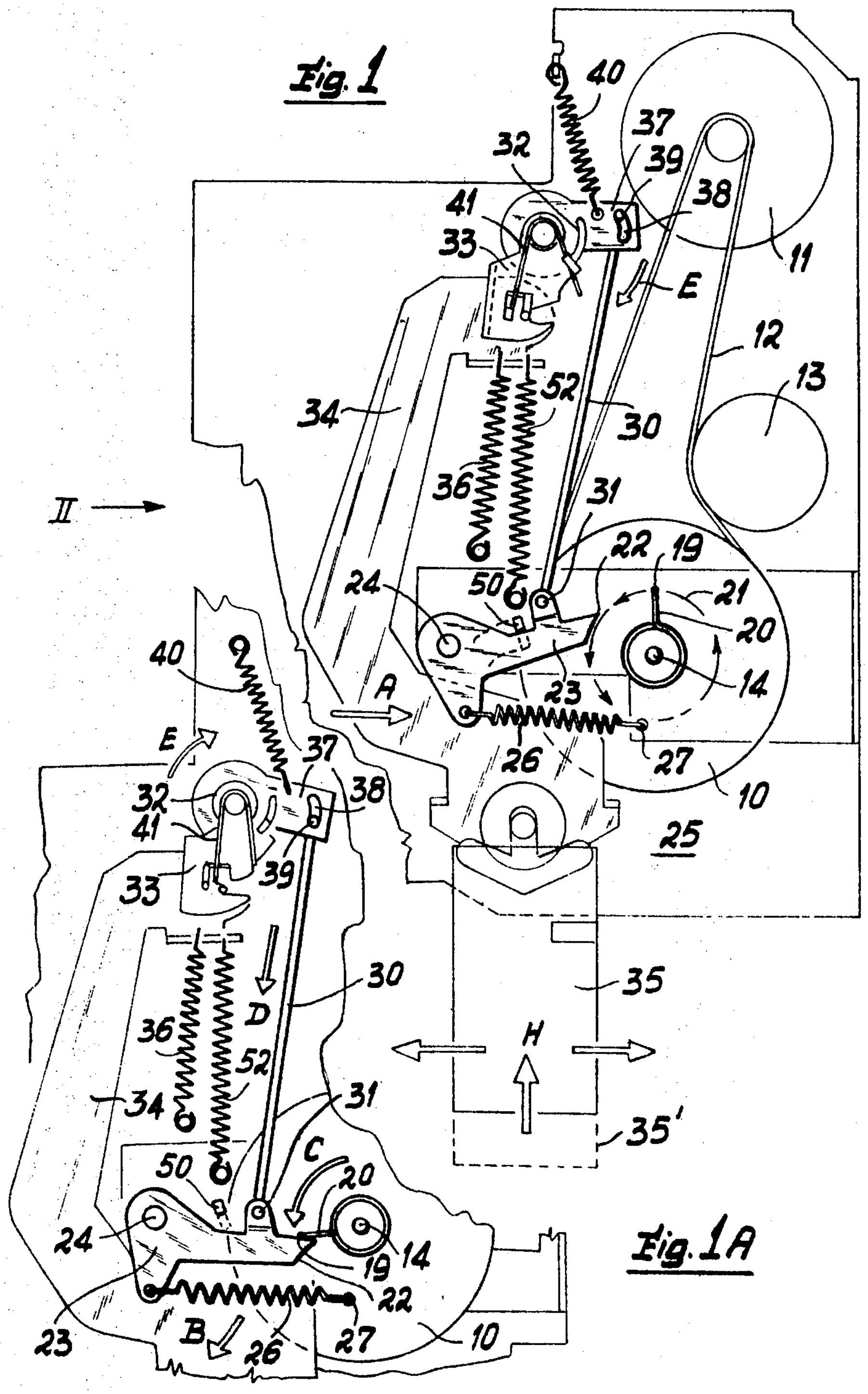

During regular service of the recorder, the end 39 of pitman 30 is in the uppermost position of said elongated hole 38, as shown in FIG. 1. Therefore, the first part of motion in direction B of lever 23, of an amplitude so as to carry said lever's point 22 to interfere with path 21 of pin 19, will cause well a motion in direction D (FIG. 1A) of pitman 30, but will not effect rotation of lever 37. Therefore, such first part or triggering part of motion of the lever 23 will not encounter the resistances of spring 40 and of the cam and latch means.

It will be therefore readily evident that a very small force will be required for triggering the above described actions leading to regular and full deactivation of the recorder, said action being performed by making use of the force resulting from the inertial mass of the rotating flywheel 10. Such very small force can be provided by the increase of pull to which the magnetic tape is subject when fully wound about one reel in the cassette.

As shown best in FIGS. 3 and 3A, a small tape follower and sensing finger 42 is secured to or integrally formed with an end of a rocker lever 43 pivoted at 44 and the other end 45 of which abuts on one end 46 of another rocker lever 47 pivoted at 48. The rocker lever 47 has a downwardly directed portion 49 integrally formed at its other end, said portion abutting on a flank of said lever 23. Such portion 49 is provided by the fact that the rocker levers 43 and 47 are located above the flywheel 10 while the lever 23 is located beneath same flywheel, as shown in FIG. 2, for the adaptation of the device to the general conventional arrangement of parts and components in the recorder.

The spring 26 provides also the necessary bias of said rocker levers for maintaining same in their regular "resting" positions shown in FIG. 3 and for ensuring sensitivity to the tape pull sensing finger 42. As shown in FIG. 3, the tip of said finger 42 acts on the tape 18 and noticeably deviates it from its straight direction which such tape would maintain if undisturbed, under the pull exerted by driving spindly 14. Such deviation can be obtained by applying a very small lateral thrust, because the counterpull provided by conventional very light braking of supply reel is correspondingly very small.

During regular service of the recorder, the said finger rocker levers and lever 23 are therefore in the position of FIG. 3, and the tape 18 runs sliding on the tip of finger 42, which senses said small counterpull thereof.

Assuming now that the tape would be completely wound about the takeup reel 17, its trailing end, secured to the core of supply reel 16, will provide a relevant and insuperable resistance (within the limits of tape strength) to said pull, which will therefore increase and, tending to straighten the tape path, will apply a small but noticeable force in direction F (FIG. 3A) to the sensing finger 42, causing the rocker levers 43 and 47 to rock in corresponding directions F and G, and hence providing the initial triggering motion in direction B of the trigger lever 23, leading to promote actuation of the described action provided by the inertial mass of flywheel 10.

It must be taken in mind that an operator, who will carefully handle the recorder and watch the progressing winding of the tape about the takeup reel in the cassette, is supposed to promptly act for full deactivation of the recording as soon as the tape is or is about to be fully wound about said takeup reel, and then he should take the necessary steps for having the tape at least partially rewound about the supply reel or having the cassette replaced.

Now, the invention, as above described, automatically ensures such full deactivation. If the operator would attempt to simply restart the recorder, the resulting overpull applied to the take will immediately retrigger the described actions, as conventional, a new action in direction H on the knob 35 (now at 35'), for restarting the recorder, will carry the pressure roller 15 (the conventional support plate of which, whereon the erasing and scanning members are supported too, is shifted into operational position by spring pitman 52) into its operational engagement with the tape and urges the same tape into frictional engagement with the driving spindle 14, which has been at its turn driven by the motor the supply circuit of which has been closed by the same restarting or reactivating manual operation.

Therefore, the new device not only provides for automatically performing that action which was supposed to be taken by a careful operator, but also that no further action not compatible with full winding of the tape about the takeup reel will go into effect.

A simplified embodiment of the device is shown in FIGS. 4 to 7. Such simplified modification of the invention will not provide for complete deactivation of the recorder but only for opening of at least part of its electrical circuits. Such limited action is however performed in such manner that reactivation of the recorder will require, on the operator's part, a first step consisting of complete deactivation as described.

In this simplified embodiment (in FIGS. 4 to 7 the parts corresponding to those of FIGS. 1 to 3A are indicated by same reference numerals) the tip of the tape pull sensing finger 42 urges the tape 18 in a portion thereof comprised within two guide pins and 120 and 121 provided in the cassette M, in the interval between the locations wherein the tape engages the erasing 114 and the scanning member 115. Such arrangement corresponds to that used in the preferred embodiment of FIG. 1 to 3A.

Said sensing finger 42 is formed integrally with a lever 123 pivoted at 124 and biased in direction P by a light spring (not shown) for sensing the tape pull, when the recorder is in its operational condition, that is the sensing finger, the eraser and scanning member and the pressure roller 15, all supported by a shiftable plate 113, as conventional, are displaced in direction R into their tape cooperational active positions.

Figures 4, 5, 6, 7:
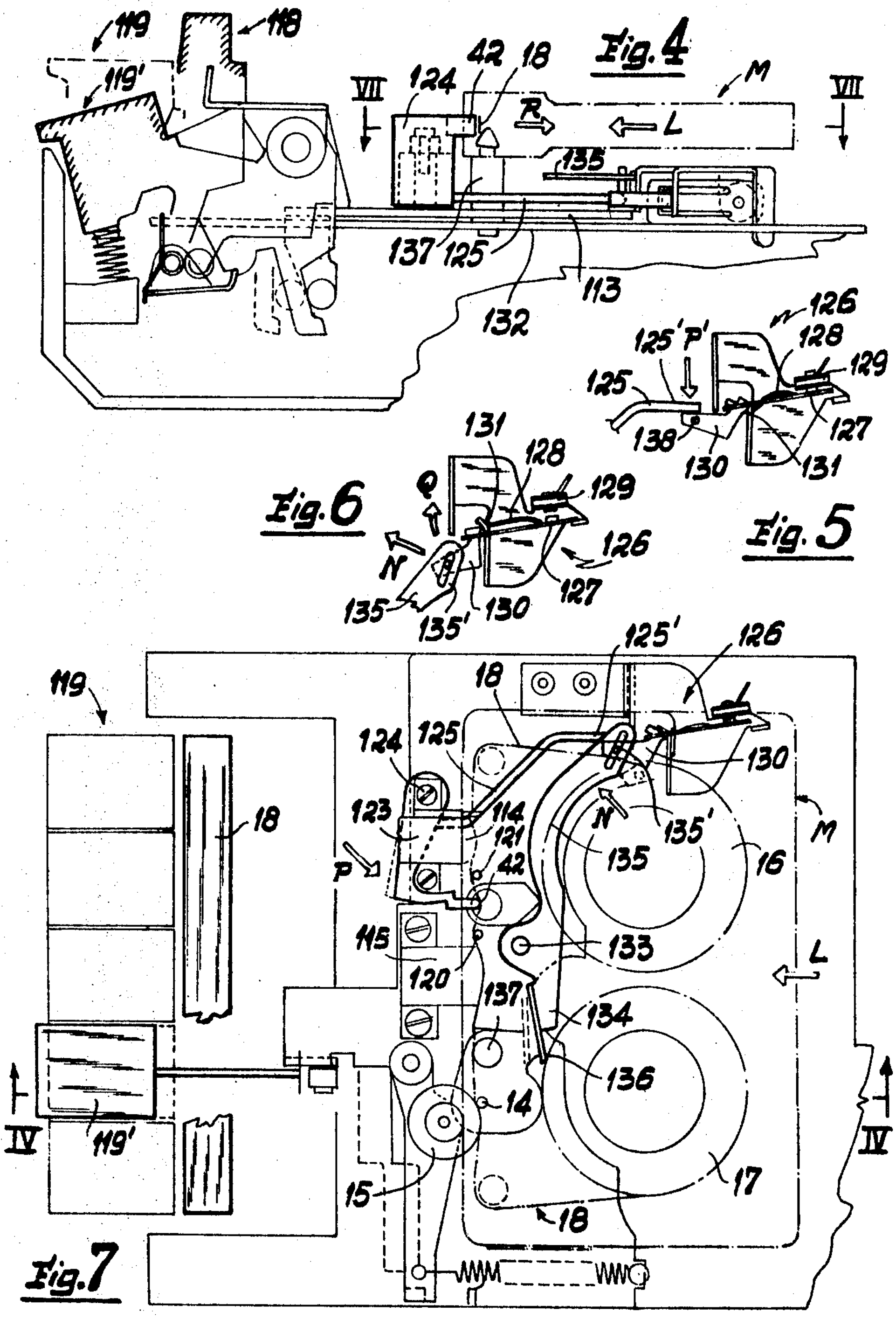
FIG. 4 illustrates a simplified embodiment of the invention, in side view and partly in sectional view taken essentially along line IV–IV OF FIG. 7.
FIGS. 5 and 6 are plan views of a deactivating means forming bistable switch of the embodiment of FIG. 4, in its reproducer activating and respectively deactivating position.
FIG. 7 is a diagrammatical top plan view of a reproducer comprising the device of FIGS. 4 to 6.

A lightweight lever 125 is secured to lever 123 for concurrent movement therewith, and the tip 125' of said lever engages a bistable snap-type switch means generally indicated at 126. Said switch 126 comprises a movable contact 127 supported by a conventionally made spring arm 128 and which is normally closed upon a fixed contact 129 (FIG. 5). The snap-action shifting of contact arm 128 is provided by movement of a piece 130 having it pivot at 131 on the stationary structure of the switch means, secured to the stationary plate 132 of the recorder.

A rocker arm pivoted at 133 to a pivot secured to said stationary plate 132 has one arm 134 having a shoulder platelet 136 adapted to abut against one spindle 137 of the spindles which currently produced recorders of the magazine or cassette type are provided with, when the shiftable plate is shifted in direction L, upon pressure applied by the operator on the deactivation knob, such as knob 118. The abutment of platelet 136 on the spindle 137 causes said rocker arm to rock about its pivot at 133 and causes the other arm 135 thereof to swing in direction N.

The piece 130 has a pivot pin 138 secured thereto and engaged in the slotted end portion 135' of rocker arm part 135. This piece causes snap spacing of contact 127 from fixed contact 129 when pressed in direction P', as shown in FIG. 5, as the tip 125' of arm lever 125 does when the sensing finger 42 has sensed an increased pull in the magnetic tape. The return motion of said levers 125 and 123, as the overpull of tape 18 disappears, does not affect the bistable switch, which remains open, until the operator has completely deactivated the recorder, by acting on knob 118.

The consequent rocking in direction N of the rocker arm 134, 135 provides for reclosing of the switch means contacts 127, 129, but this closure does not affect the operation of the recorder, which has been completely deactivated by the operator. The switch means 126 will however be reset for a new service of the recorder, as provided by the operator upon action on the control knobs of the apparatus, such as the activation push-knob 119' comprised among the various control knobs 119 thereof.

Therefore, the device of the invention, even when constructed in a rather simple manner and designed for providing a limited deactivation only (opening of circuits, at least of the motor supply circuit), operates in such a manner to compel the operator to completely deactivate the recorder/reproducer as a necessary step for subsequent reactivation thereof because, if the double movement in directions L and R of the movable subassemblies will not be made, the bistable means will remain in its spaced contacts condition of FIG. 6.

A suitable warning means, such as a warning lamp or a buzzer, might be connected for activation when the device has operated in response to sensing of overpull of the tape, by means of a second fixed contact (not shown) opposite to contact 129 and positioned for abutment of movable contact arm 128 when spaced from the said first fixed contact 129. The operator, being promptly made aware of complete winding of the tape about one reel, can provide for the necessary action.

I claim:

1. In a tape recording and reproducing apparatus of the type in which the tape is contained in a cassette having a supply reel and a takeup reel rotatably supported therein with opposite ends of the tape secured to the core of said takeup and said supply reel, respectively, a combination comprising tape drive means for winding the tape from one onto the other reel, the tape being subjected to increased pull when completely wound up on one of said reels, particularly about said takeup reel, while the tape drive means are active; erasing and scanning members adapted to engage the tape; a pair of shiftable components respectively supporting said cassette and said erasing and scanning members for movement relative to each other between an active position in which said members engage the tape and a deactivated position in which said members are spaced from said tape; biasing means cooperating with said components and tending to move the same to said deactivated position; latch means movable between a locking position cooperating with said components to hold the latter against the force of said biasing means in said active position and a releasing position; operator controlled means for moving said latch means at the will of the operator between said locking and said releasing position; sensing means biased into engagement with a portion of the tape between said supply and said takeup reel for continuously sensing the pull applied to the tape, said sensing means being subjected to a signally displacement upon occurrence of said increased pull; and apparatus deactivating means mechanically connected to said sensing means and comprising latch unlocking means triggered for unlocking said latch means by said signally displacement of said sensing means.

2. A combination as defined in claim 1 and further comprising a flywheel forming part of said tape drive means; a member eccentrically secured to said flywheel and performing a circular path when the apparatus is active; a trigger lever swingably supported for movement between an inactive position outside said path and a path interfering position; further biasing means for holding said trigger lever in said inactive position with a force smaller than that provided by said sensing means in the signalling displacement thereof, said trigger lever being linked to said sensing means for displacement of said trigger lever into said path interfering position by said signalling displacement, and said trigger lever being further linked to said latch means for unlocking the same when further displaced by interference of said trigger lever with said circularly rotating member eccentrically secured to said flywheel so that unlocking of said latch means is produced by the inertia of said flywheel.

3. A combination as defined in claim 2 and including lost motion transmission means for connecting said trigger lever to said latch means so that said latch means remains unaffected by a first part of said further displacement of said trigger lever by said member eccentrically secured to said flywheel.